(12) United States Patent
Pallaver et al.

(10) Patent No.: US 6,613,811 B1
(45) Date of Patent: Sep. 2, 2003

(54) MICROCELLULAR THERMOPLASTIC ELASTOMERIC STRUCTURES

(75) Inventors: Matthew Pallaver, Lexington, MA (US); Sung W. Cha, Koyang-Si (KR)

(73) Assignee: Trexel, Inc., Woburn, MA (US)

( * ) Notice: Subject to any disclaimer, the term of this patent is extended or adjusted under 35 U.S.C. 154(b) by 0 days.

(21) Appl. No.: 09/708,846

(22) Filed: Nov. 8, 2000

Related U.S. Application Data

(63) Continuation of application No. PCT/US99/12415, filed on Jun. 3, 1999.

(51) Int. Cl.[7] .................................................. C08J 9/00
(52) U.S. Cl. ......................... 521/81; 521/79; 521/134; 521/139; 521/140
(58) Field of Search ........................... 521/79, 81, 139, 521/140, 134; 525/191

(56) References Cited

U.S. PATENT DOCUMENTS

| | | | |
|---|---|---|---|
| 1,243,575 A | | 10/1917 | Green et al. |
| 3,806,558 A | | 4/1974 | Fischer |
| 4,047,860 A | | 9/1977 | Dinzburg et al. |
| 4,055,699 A | | 10/1977 | Hsiung |
| 4,187,621 A | | 2/1980 | Cohen |
| 4,192,497 A | | 3/1980 | Perun et al. |
| 4,247,652 A | | 1/1981 | Matsuda et al. |
| 4,263,727 A | | 4/1981 | Bender et al. |
| 4,473,665 A | | 9/1984 | Martini-Vvedensky et al. |
| 4,513,518 A | | 4/1985 | Jalbert et al. |
| 4,627,178 A | | 12/1986 | Sullivan et al. |
| 4,633,877 A | | 1/1987 | Pendergast |
| 4,663,865 A | | 5/1987 | Telecemian |
| 4,674,204 A | | 6/1987 | Sullivan et al. |
| 4,694,589 A | | 9/1987 | Sullivan et al. |
| 4,769,926 A | | 9/1988 | Meyers |
| 4,794,707 A | | 1/1989 | Franklin et al. |
| 5,034,171 A | * | 7/1991 | Kiczek et al. |
| 5,116,881 A | * | 5/1992 | Park et al. |
| 5,116,883 A | * | 5/1992 | LeMay |
| 5,158,986 A | | 10/1992 | Cha et al. |
| 5,160,674 A | | 11/1992 | Colton et al. |
| 5,234,964 A | | 8/1993 | Lin et al. |
| 5,331,015 A | | 7/1994 | DesMarais et al. |
| 5,334,356 A | | 8/1994 | Baldwin et al. |
| 5,348,458 A | | 9/1994 | Pontiff |
| 5,362,435 A | | 11/1994 | Volpe |
| 5,402,588 A | | 4/1995 | Graham et al. |
| 5,561,920 A | | 10/1996 | Graham et al. |
| 5,670,102 A | * | 9/1997 | Perman et al. |
| 5,675,915 A | | 10/1997 | Faughn et al. |
| 5,844,009 A | | 12/1998 | Hurley et al. |
| 5,851,617 A | * | 12/1998 | Keiser |
| 5,866,053 A | | 2/1999 | Park et al. |
| 5,883,144 A | | 3/1999 | Bambara et al. |
| 5,883,145 A | | 3/1999 | Hurley et al. |
| 5,904,965 A | | 5/1999 | Noel et al. |
| 6,005,013 A | | 12/1999 | Suh et al. |
| 6,093,752 A | * | 7/2000 | Park et al. |
| 6,231,942 B1 | * | 5/2001 | Blizzard et al. |
| 6,235,380 B1 | | 5/2001 | Tupil et al. |
| 6,284,810 B1 | | 9/2001 | Burnham et al. |
| 6,376,059 B1 | | 4/2002 | Anderson et al. |
| 6,384,096 B1 | * | 5/2002 | Ladang et al. |

FOREIGN PATENT DOCUMENTS

| | | |
|---|---|---|
| WO | WO 9808667 | 3/1998 |
| WO | WO 98/47783 | 10/1998 |
| WO | WO 99/10395 | 3/1999 |

OTHER PUBLICATIONS

"Polymer Science Dictionary" second edition, by Mark Alger, Oct. 16, 1997, p. 566.*

Rader, Charles P., "Thermoplastic Elastomers: TPES shine with growth rates three to five times that of rubber or plastics", Modern Plastics, Mid–Nov. 1996, pp. B–51–B–52.

Rotman, D. "Metallocene Polyolefins: Commodity capacity is a reality", Chemical Week, May 21, 1997, pp. 23–26.

Walton, Kim L. et al., "Polyolefin Elastomer Foams Having Enhanced Physical Properties Prepared With Dual Crosslink System" Annual Technical Conference –Society of Plastics Engineers, vol 55, No. 3, 1998, pp. 3250–3254, XP001146392.

* cited by examiner

Primary Examiner—Morton Foelak
(74) Attorney, Agent, or Firm—Wolf, Greenfield & Sacks, P.C.

(57) ABSTRACT

Microcellular thermoplastic elastomeric polymeric structures are provided. The articles have an average cell size of less than 100 μm and a compression set ranging from less than about 30% to less than about 5%, and a rebound value of at least 50%. The articles may be formed from a thermoplastic elastomeric olefin, preferably metallocene-catalyzed polyethylene. The density of the articles ranges from less than 0.5 gm/cm$^3$ to less than 0.3 gm/cm$^3$.

36 Claims, 3 Drawing Sheets

MICROCELLULAR THERMOPLASTIC ELASTOMERIC STRUCTURES

RELATED APPLICATIONS

The present invention is a continuation of International patent application Ser. No. PCT/US99/12415, filed Jun. 03, 1999, which claims priority to U.S. patent application Ser. No. 09/089,646, filed Jun. 03, 1998.

BACKGROUND OF THE INVENTION

1. Field of the Invention

The present invention is related to foamed structures and, more particularly, to microcellular thermoplastic elastomeric polymeric structures.

2. Background of Related Art

It is known to use thermoplastic foamed material for shoe soles and other energy absorbing impact structures. However, conventional foaming methods sometimes have difficulty producing foamed material having substantially uniform density and cell structure throughout the article. Most conventional techniques can only produce foams with large cells on the order of 100 microns or larger and with densities of about 20–90 percent of the parent material. Fracturing of these large cell foam materials result in low strengths, typically much less than by merely the factor of reduced density. Compression of these large cell foam materials typically results in high compression sets.

Material utilized for athletic shoe soles, particularly the mid-soles, must exhibit requisite levels of softness, resiliency, compressive strength, compressive set resistance, and specific gravity. Mid-sole materials for the athletic footwear industry include both crosslinked and uncrosslinked foamed thermoplastic materials, including a typical mid-sole material, crosslinked ethylene vinyl acetate (EVA). Restrictions on specific gravity of the material useful for shoe soles may sometimes limit the methods which may be used to form shoe sole material, particularly for the mid-sole. For example, injection molding may typically only be used with materials having higher specific gravities than those suitable for use in athletic shoe mid-soles, as lower density materials will often not foam uniformly, thereby causing broken cells within the foamed product.

Thermoplastic elastomers (TPEs) are a group of materials having properties which fall between cured rubbers and soft plastics, and are known to be used for seals, gaskets, shoe soles, and in general, flexible parts. TPEs are hybrid material systems including at least two or more intermingled polymer systems, each having its own phase and softening temperature (Ts). TPEs are made up of a hard thermoplastic phase and a soft elastomeric phase. The useful temperature of a TPE occurs in the region where the soft phase is above and the hard phase is below their respective Ts. The hard phase acts to anchor or restrict the movement of polymer chains of the soft phase, generating resistance to the deformation of the TPE. The reinforcement of the hard phase disappears above its Ts, and the TPE becomes a viscous liquid that can be shaped in the same general manner as an unvulcanized thermoset rubber. Upon cooling below its Ts, the hard phase resolidifies and the TPE again becomes rubberlike. In contrast to the irreversible cleavage of the chemical crosslinks of a thermoset rubber, the heating and cooling through the hard phase Ts is reversible and thermoplastic in behavior. Such properties give TPEs the performance properties of conventional thermoset rubber and advantageously allow it to be molded or extruded as if it were rigid thermoplastic.

Commercial TPEs include block copolymers and elastomer/thermoplastic compositions. Two types of elastomer/thermoplastic compositions include thermoplastic elastomeric olefins (TEOs) and thermoplastic vulcanizates. The hard phase of a TEO is typically a polyolefin such as polypropylene (PP) or polyvinyl chloride (PVC), while the soft phase is typically an elastomer with little or no crosslinking, such as ethylene-propylene rubber or nitrile-butadiene, which are generally used in combination with PP and PVC, respectively. TEOs are generally characterized by low cost, and a good combination of mechanical properties at or near room temperature, including low specific gravities (0.9–1.0), hardness ranging from 50 shore A to 60 Shore D, and ultimate tensile strengths from 600 to 3000 psi. However, upon heating to 160° F. or above, TEO properties degrade rapidly due to the lack of crosslinking within the soft or elastomer phase.

Microcellular materials are desirable due to their improved mechanical properties compared to conventional foamed plastics. The improved mechanical properties of microcellular foamed materials are achieved by producing foams with uniformly and generally smaller sized cells than conventional methods, such that fractures are not initiated from cells, and such that the cells inhibit or terminate cracks without structural failure. When foamed using atmospheric gases, microcellular foaming processes are environmentally desirable polymer foaming processes. In general, microcellular foamed materials are produced by saturating a polymer with a gas or supercritical fluid and using a thermodynamic instability, typically a rapid pressure drop, to generate billions of cells per cubic centimeter within the polymer.

British Patent No. 1243575 issued to Green et al. on Aug. 18, 1971 discloses a flexible insole including a heat insulating layer of polyethylene secured thereto.

U.S. Pat. No. 3,806,558 issued to Fischer on Apr. 23, 1974 discloses a thermoplastic elastomeric blend including a dynamically partially cured blend of monolefin copolymer rubber and polyolefin plastic.

U.S. Pat. No. 4,187,621 issued to Cohen on Feb. 12, 1980 discloses a molded inner sole having a top and a bottom layer made substantially of crosslinked polyethylene, preferably having a density of 100–180 mm per cubic meter, and a compression set of about 1–6%.

U.S. Pat. No. 4,263,727 issued to Mender et al. on Apr. 28, 1981 discloses a sheet for manufacturing cushioned insoles, including a substrate and a foamed plastic layer laminated together, wherein the foamed plastic layer comprises a closed cell crosslinked polyolefin foam, preferably polyethylene, having a density of 25–200 kg per meter cubed, and thickness of 1.5–15 mm.

U.S. Pat. No. 4,247,652 issued to Matsuda et al. on Jan. 27, 1981 discloses a partially crosslinked thermoplastic elastomeric composition.

U.S. Pat. No. 4,473,665 to Martini-Vvedensky et al. discloses the formation of microcellular material.

U.S. Pat. No. 4,513,518 issued to Jalbert et al. on Apr. 30, 1985 discloses an inner sole with a cushioning layer of crosslinked polyethylene foam laminated to a thinner layer of thermoformable polyethylene foam.

U.S. Pat. No. 4,633,877 issued to Pendergast on Jan. 6, 1987 discloses an orthotic device, including variable urometer material comprising varying densities of closed cell microcellular polyethylene.

U.S. Pat. No. 5,158,986 to Cha et al., on Oct. 27, 1992 discloses the formation of microcellular material.

U.S. Pat. No. 5,348,458 issued to Pontiff on Sep. 20, 1994 discloses a foamed, molded, uncrosslinked article which may be formed from polyethylene.

Accordingly, a polymeric foamed material that addresses the issues of compression set, rebound characteristics, and specific gravity will be valuable.

SUMMARY OF THE INVENTION

In one embodiment, the present invention involves the production of articles comprising microcellular thermoplastic elastomeric polymeric structures having an average cell size of less than 100 $\mu$m, a compression set ranging from less than about 30% to less than about 5%, and a rebound value of at least 50%. The articles may be formed from a thermoplastic elastomeric olefin, preferably metallocene-catalyzed polyethylene. The density of the articles ranges from less than 0.5 gm/cm$^3$ to less than 0.3 gm/cm$^3$.

In another embodiment the structure is crosslinked, through which compression set values as low 2% may be achieved. A crosslinked structure can be achieved by activating a crosslinking agent in a precursor of the structure, preferably by irradiative crosslinking of a precursor of the structure. Alternatively, no auxiliary crosslinking agent is required where the precursor has sites that are amenable to crosslinking (e.g. an olefin).

The structures of the present invention have a compression set of less than about 30% when constructed and arranged in a position to be compressed, including repeatedly compressed, at least 50%. The compression set of less than about 30% is maintained when the structures are constructed and arranged in a position to be repeatedly compressed, at least 500 times, at least 50% and having a compression set of less than about 30%. The structures may also have a rebound of at least about 50% when constructed and arranged in a position to be compressed at least 50%, at least 500 times.

In another embodiment, an article comprising a microcellular thermoplastic elastomeric polymeric structure is provided, including a compression set of less than about 30%, a density of less than 0.5 gm/cm$^3$, a rebound value of at least 50%, an average cell size of less than 100 $\mu$m, and a maximum cell size of less than 125 $\mu$m. The article may be crosslinked or uncrosslinked. When crosslinked, the compression set of the article is reduced to less than about 2%.

In another embodiment, an article comprising a shoe sole constructed for attachment to a shoe upper is provided, formed of thermoplastic elastomeric polymeric microcellular material.

In another embodiment, an article comprising a gasket is provided, formed of thermoplastic elastomeric polymeric microcellular material.

Another embodiment involves a method of providing a precursor of a crosslinked microcellular thermoplastic elastomeric polymeric structure and crosslinking the precursor to form a crosslinked microcellular thermoplastic elastomeric polymeric structure. Crosslinking may be achieved by activating a crosslinking agent in the precursor, preferably by irradiating the precursor.

The foregoing and other objects, features, aspects and advantages of the invention will become apparent from the following detailed description of the present invention when taken in conjunction with the accompanying drawings. For purposes of clarity, not every component is labeled in every figure.

BRIEF DESCRIPTION OF THE DRAWINGS

Various embodiments are described herein with reference to the drawings, wherein.

DETAILED DESCRIPTION

Figure 1:
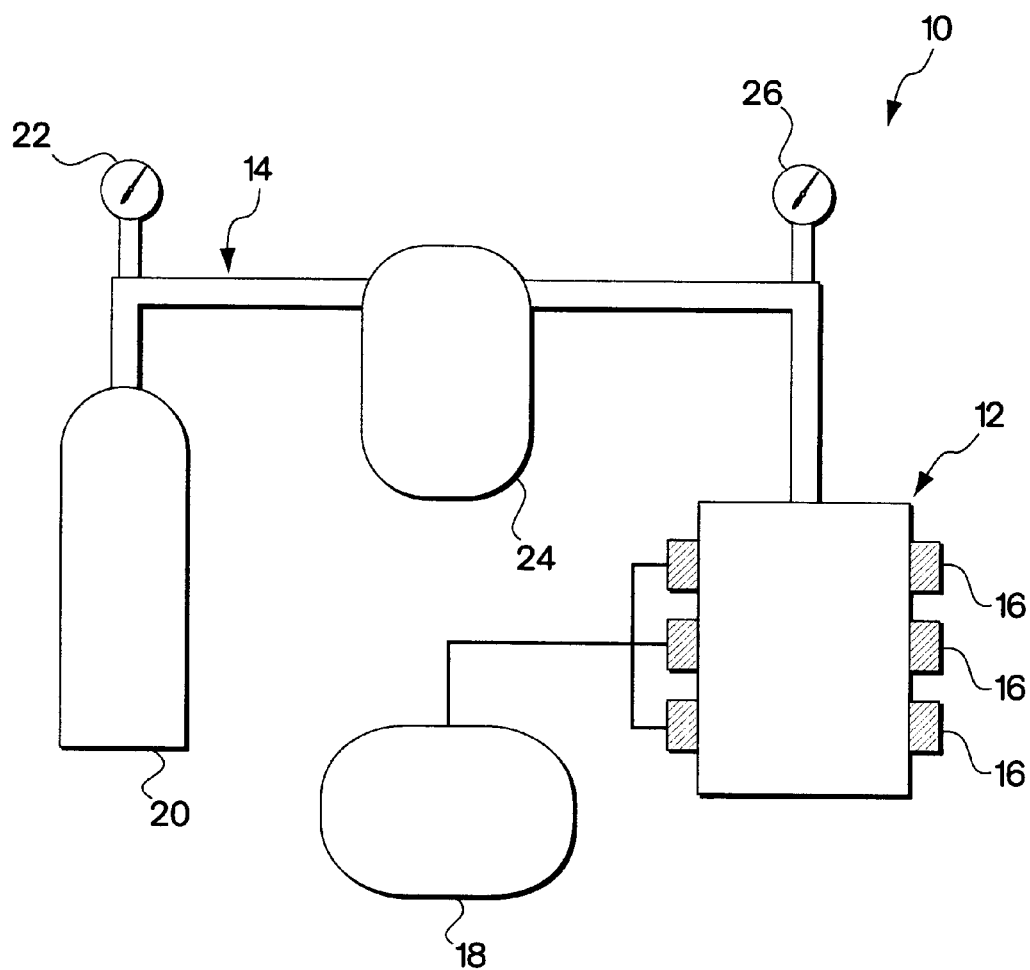
FIG. 1 is a diagram of a batch system for forming the microcellular thermoplastic elastometer polymeric material of the present invention.

The present invention involves the discovery that microcellular thermoplastic elastomeric polymeric structures having average cell sizes of less than about 100 microns have improved compression set compared to conventional foamed polymeric structure, typically less than about 30%. The microcellular TPE structures are suitable in applications requiring low compression set, such as, for example, shoe soles and gaskets. The microcellular TPE structures of the present invention may also be crosslinked, providing a significant reduction in compression set. "Microcellular," as used herein, refers to polymeric material having average cell sizes of less than about 100 microns. "Thermoplastic elastomeric material" and "TPE" as used herein, include, but are not limited to materials and structures formed without the use of plasticizers, having properties somewhere in between rubber and plastic. Thermoplastic elastomeric material is described in "TPEs shine with growth rates three to five times that of rubber or plastics", Modern Plastics, Mid-NOVEMBER, 1996, pp. B51–B52, incorporated herein by reference.

The microcellular TPE structures of the present invention are particularly advantageous when crosslinked because, surprisingly, the compression set may be greatly reduced compared to other crosslinked foam materials. Crosslinked, as used herein, means that at least 5% of the polymer chains are connected to another polymer chain. Crosslinking may be accomplished via a variety of known mechanisms, but it is preferred that the article be irradiated to achieve crosslinking, preferably via electron beam radiation. Alternatively, conventional free radical generating or crosslinking agents such as hydrogen peroxide may be incorporated into the polymers.

Materials that are suitable for the microcellular TPE structures of the present invention include both crystalline and semicrystalline materials, including, but not limited to, polyolefins such as polyethylene and polyproplylene, crosslinkable polyolefins, styrenic polymers, polyamides, and polyaromatics such as polystyrene and polyvinyl chloride. Preferably, the materials are TEOs, more preferably thermoplastic elastomeric polyethylene, including metallocene-catalyzed elastomeric polyethylene. Other preferred materials include the ENGAGE™ series, particularly ENGAGE-AFFINITY™, available from Dow Chemical. In Table A below, various parameters for typical foamed shoe sole materials are compared in Table A to values for microcellular foamed ENGAGE-AFFINITY™ material processed according to the method of the present invention, which is described in more detail below.

TABLE A

| Parameter | Method | Sofstep EVA | NBAS EVA | ENGAGE-AFFINITY ™ | ENGAGE-AFFINITY ™ | ENGAGE-AFFINITY ™ (crosslinked) | ENGAGE-AFFINITY ™ (crosslinked) | ENGAGE-AFFINITY ™ (crosslinked) |
|---|---|---|---|---|---|---|---|---|
| Rebound (%) | | | 44 | 55 | 55 | 57 | 55 | 55 |
| Hardness (Shore A) | ASTM D-2240-86 | 50 | | 30 | 35 | | 35 | 40 |
| Hardness (Asker C) | ASTM | | 55 | 45 | 45 | 66 | 55 | 55 |
| Specific Gravity (gm/cm$^3$) | ASTM D-3575-91 | 0.42 | 0.2 | 0.315 | 0.302 | 0.4 | 0.388 | 0.400 |
| Compression Deflection (psi at 25%) | ASTM D-1056-85 | >50 | 58 | 31 | 31 | 158 | 52 | 52 |
| Compression Set (@ 50% compression) | ASTM D-1056-85 | <29 | 6 | 11.8 | 11.8 | 2.3 | 0 | 0 |

In one embodiment, uncrosslinked microcellular TPE structures of the present invention are produced preferably having a compression set of less than about 30%, more preferably less than about 20%, more preferably less than about 10%, and more preferably still less than about 5% or 3%, at 50% compression. The microcellular TPE structures also preferably include an average cell size of less than about 100 microns, more preferably less than about 50 microns, more preferably less than about 25 microns, more preferably still less than about 10 microns, and a maximum cell size of about 125 microns, preferably about 75 microns, more preferably about 50 microns, and more preferably still about 25 microns. In preferred embodiments, the microcellular TPE structures may have a density in the range of about 0.25 to about 0.50 gm/cm$^3$, and more preferably, less than about 0.30 gm/cm$^3$. Also in preferred embodiments, the microcellular TPE structures may include a rebound of at least about 50%, and an Asker C hardness of at least about 30, more preferably at least 50, and more preferably still at least 75.

A set of preferred embodiments includes all combinations of these preferred average cell sizes, maximum cell sizes, compression set, density and rebound values. That is, a preferred embodiment in this set of embodiments includes a microcellular TPE structure having a compression set of less than about 30%, a density ranging from 0.25 to 0.50 gm/cm$^3$, a rebound of at least 50%, an average cell size of less than about 75 microns, and a maximum cell size of about 100 microns, a more preferred embodiment of the invention includes a compression set of less than about 20%, a density of less than 0.30 gm/cm$^3$, a rebound of at least 50%, an average cell size of less than about 50 microns, and a maximum cell size of about 75 microns, etc.

In another embodiment, crosslinked microcellular TPE structures are produced, having a compression set of less than about 30, an average cell size of less than about 75 microns with a maximum cell size of about 100 microns. Preferably, the compression set of the crosslinked microcellular TPE structure is less than 20%, more preferably less than about 10 %, and more preferably still less than about 2%. As previously described with reference to the uncrosslinked microcellular TPE structures, in preferred embodiments the crosslinked microcellular TPE structures also preferably include a compression set of less than about 30%, average cell sizes of less than about 100 microns, more preferably less than about 50 microns, more preferably less than about 25 microns, more preferably still less than about 10 microns, and a maximum cell size of about 125 microns, preferably about 75 microns, more preferably about 50 microns, and more preferably still about 25 microns, a rebound value of at least about 50%, a density ranging from about 0.25 to about 0.5 gm/cm$^3$, and an Asker C hardness value of at least about 30, more preferably at least 50, and more preferably still at least 75.

Articles of the invention can be constructed and arranged to be repeatedly compressed at least 500 times, or preferably at least 1,000 times, or preferably at least about 10,000 times, according to some embodiments. Other articles of the invention may be constructed and arranged to be continuously compressed, over the lifetime of the article, according to other embodiments. Those who are skilled in the art understand the meaning of a structure that is constructed and arranged to be repeatedly or continuously compressed. Articles that are constructed and arranged to be repeatedly compressed include such structures as an inner sole and a shoe sole, or the like. Articles that are constructed and arranged to be continuously compressed include such structures automotive sealants, building and construction sealants, gaskets used to seal a door or window, or the like. The microcellular TPE structures according to the invention, whether uncrosslinked or crosslinked, may be shaped to form flexible plastic parts, such as, for example, inner soles, shoe soles, seals, and gaskets, automotive sealants, building and construction sealants, or any other structure where low compression set is desirable.

One preferred embodiment of the present invention is a microcellular TPE structure that is shaped to form a shoe sole, providing good compression set and rebound in combination with a light weight structure which is advantageous for shoe soles, particularly athletic shoe mid-soles. Those of ordinary skill in the art understand the meaning of the term "shoe sole" as used herein. For the sake of clarity, the term "shoe sole" is meant to refer to an article having substantially the shape of a human foot. That is, typically an elongated member having opposing rounded ends, with an indentation on one side therebetween corresponding to the instep of a foot. The member may be substantially the same thickness from end to end, or alternatively, one end may be thicker than the other. The shoe sole of the present invention may be useful in many applications, including, but not limited to, athletic shoes, footwear, boots, hiking boots, ski boots, orthopedic shoes, or any other type of footwear structure where the properties of the present structure would be beneficial. Particularly preferred embodiment of the present invention, providing exemplary compression set, is a crosslinked microcellular TPE structure formed from metallocene catalyzed polyethylene that is shaped to form an inner sole, or a shoe sole.

Another preferred embodiment of the present invention is a microcellular TPE structure that is shaped to form a gasket, providing good compression set and rebound in combination with a light weight structure which, as described above, is advantageous for automotive sealants, building and construction sealants, gaskets used to seal a door or window, or the like.

Figure 3A:
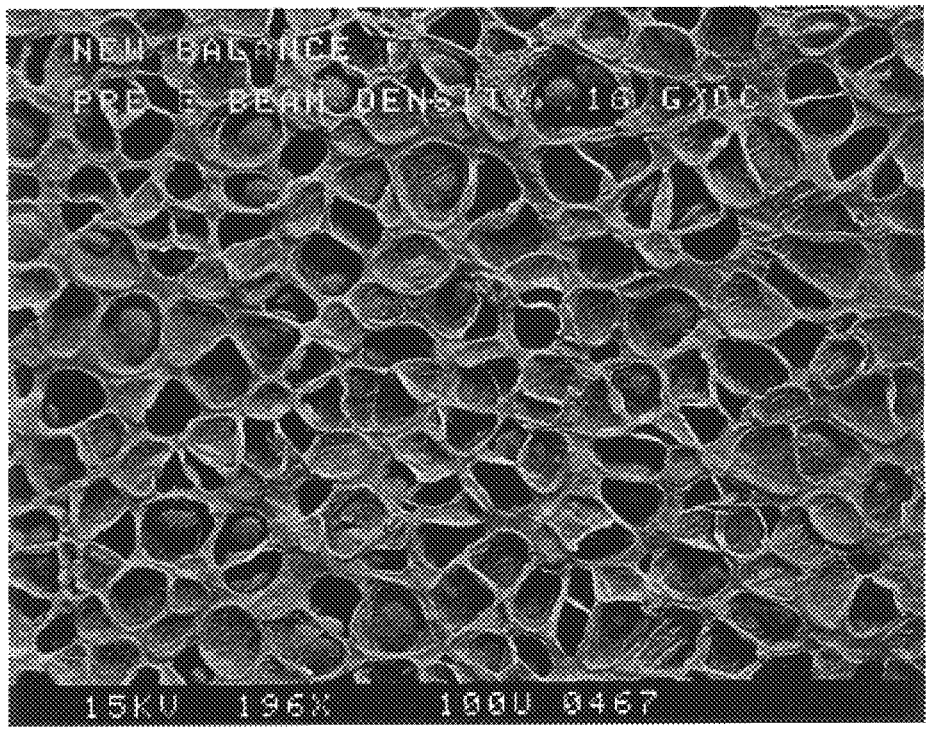
FIG. 3A is an SEM of an exemplary microcellular thermoplastic elastometer polymeric material in one embodiment of the present invention before crosslinking.
Figure 3B:
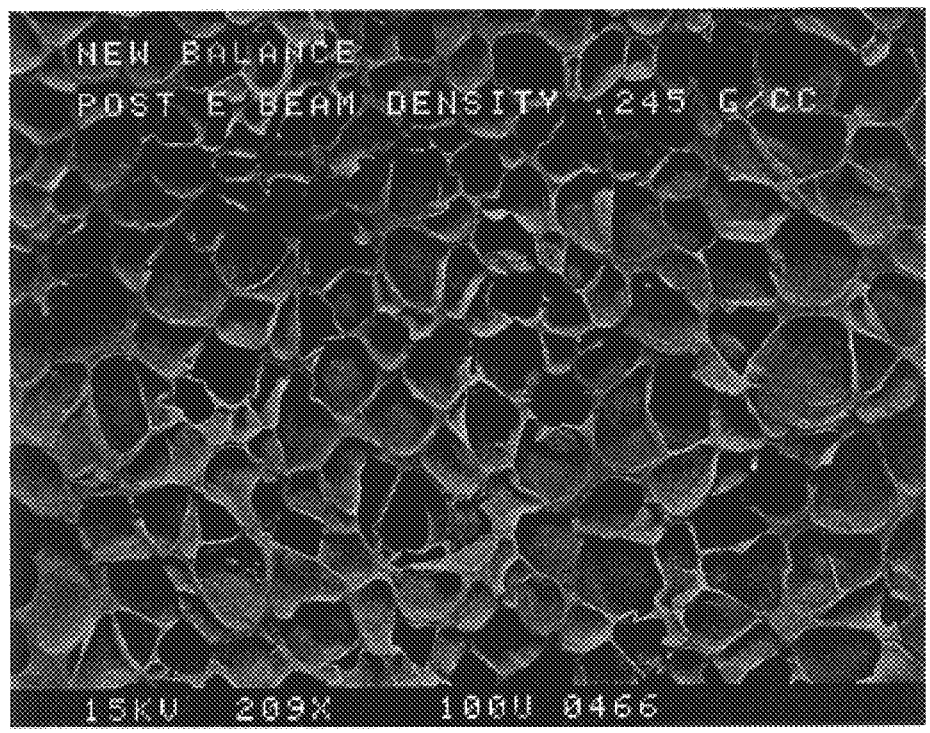
FIG. 3B is an SEM of the microcellular thermoplastic elastometer polymeric material of FIG. 3A after crosslinking.

FIGS. 3A and 3B illustrate another embodiment of the present invention, which is a method of providing the crosslinked microcellular TPE polymeric structures. The method involves providing a precursor of a crosslinked microcellular TPE polymeric structure, and crosslinking the precursor to form the structure. According to the method, the crosslinking of the precursor may be performed by either by activating a crosslinking agent contained in the structure, or by irradiating the precursor. The irradiation of the precursor may be accomplished by any means of providing radiation including, but not limited to, ultraviolet, electric beam, and x-ray. Preferably, the crosslinking is accomplished by electron beam radiation. FIGS. 3A and 3B are SEMs of a precursor material before and after crosslinking via electron beam radiation. Those of skill in the art know that crosslinking may provide an increase in the density of polymeric material, while simultaneously decreasing the compression set of the material. Surprisingly, in some instances, when the microcellular TPE polymeric structures have been crosslinked, compression set values have been reduced to zero.

The following example illustrates in greater detail a method of providing such crosslinked material.

EXAMPLE

An unfoamed 3 mm thick sample of injection molded ENGAGE-AFFINITY™ (SM-1300, available from Dow Chemical Co.) having a density of 0.87 gm/cm$^3$, a melt index of 30, and a Mooney viscosity of 2.5 was used for the experiment.

The sample was foamed using a system as in FIG. 1, which illustrates a typical microcellular batch foaming system 10. The foaming system 10 includes a foaming chamber 12 and a blowing agent delivery system 14. The foaming chamber 12 includes band heaters 16 surrounding the chamber 12 for providing heat to the chamber 12, and a temperature controller 18 for controlling the temperature in the chamber 12. The blowing agent delivery system 14 includes a source of blowing agent 20, a pressure controller 22 for controlling the delivery pressure of the blowing agent 20, pressurizing means 24 for pressurizing the blowing agent, thereby preferably rendering the blowing agent supercritical, and a pressure controller 26 for controlling the delivery pressure of the supercritical blowing agent to the foaming chamber 12.

Figure 2:
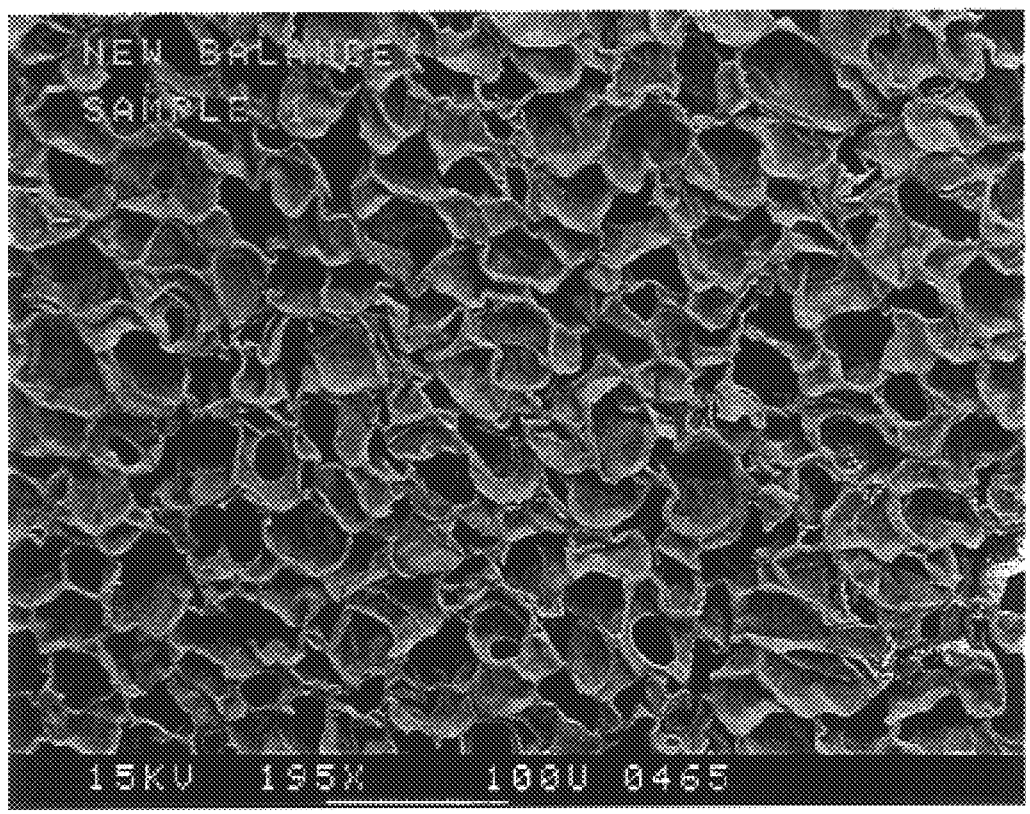
FIG. 2 is an SEM of an exemplary microcellular thermoplastic elastometer polymeric of the present invention.

The sample was placed in the foaming chamber 12, and pressurized $CO_2$ was delivered to the chamber at about 1500 to about 300 psi. The $CO_2$ diffused into the sample, as it was saturated with the supercritical $CO_2$ from 30 minutes to 24 hours. Upon opening the chamber and releasing the pressure in the chamber, the sample was subjected to a rapid decrease in pressure, followed by immersion in a 50° C. glycerin bath, allowing the dissolved $CO_2$ in the sample to form nucleation sites which expand to cause the material to foam, producing a microcellular article as shown in FIG. 2, and having the characteristics set forth in Table A below. Specimens 1 and 2 were not crosslinked. Two of the samples (Specimens 3 and 4) were crosslinked with a dose of about 29 MRad via exposure to electron beam radiation to effect crosslinking.

The compression set, compression deflection, specific gravity, rebound, and hardness of the samples were measured using standard test methods, listed below in Table B. The results listed in Table B show that both uncrosslinked and crosslinked microcellular TPE structures exhibit properties that are desirable for many of the applications described herein.

TABLE B

| Parameter | Method | 1 | 2 | 3 | 4 |
| --- | --- | --- | --- | --- | --- |
| Electron Beam Energy (MRad) | Electron Beam | 0 | 0 | 29 | 29 |
| Compression Set (@ 50% compression) | ASTM D-1056-85 | 11.8 | 11.8 | 0 | 0 |
| Compression Deflection (psi at 25%) | ASTM D-1056-85 | 31 | 31 | 52 | 52 |
| Specific Gravity (gm/cm3) | ASTM D-3575-91 | 0.315 | 0.302 | 0.388 | 0.400 |
| Rebound (%) | | 55 | 55 | 55 | 55 |
| Hardness, Shore A | ASTM D-2240-86 | 30 | 35 | 35 | 40 |
| Hardness, Asker C | ASTM | 45 | 45 | 55 | 55 |

It will be understood that various modifications may be made to the embodiments disclosed herein. For example, although the embodiments disclosed herein are with reference to ENGAGE-AFFINITY™, any TPE polymer material may be used to form the structures of the present invention, particularly metallocene-catalyzed TPEs. Additionally, the structures may also advantageously be formed used a continuous process, rather than the illustrative batch process described herein. Therefore, the above description should not be construed as limiting but merely as exemplifications of preferred embodiments. Those skilled in the art will envision other modifications within the scope and spirit of the claims appended hereto.

What is claimed is:

1. An article comprising a microcellular thermoplastic elastomeric polymeric structure including an average cell size of less than 100 μm and a compression set of less than about 30%, the thermoplastic elastomeric polymeric structure comprising a thermoplastic phase, having a first softening temperature, intermingled with an elastomeric phase, having a second softening temperature different than the first softening temperature.

2. An article as in claim 1, further comprising a compression set of less than about 20%.

3. An article as in claim 1, further comprising a compression set of less than about 10%.

4. An article as in claim 1, further comprising a compression set of less than about 5%.

5. An article as in claim 1, further comprising an average cell size of less than 75 μm.

6. An article as in claim 1, further comprising an average cell size of less than 50 μm.

7. An article as in claim 1, further comprising an average cell size of less than 30 μm.

8. An article as in claim 1, wherein the microcellular thermoplastic elastomeric polymeric structure is a thermoplastic elastomeric olefin.

9. An article as in claim 1, further comprising a density of less than 0.5 gm/cm$^3$.

10. An article as in claim 1, further comprising a density of less than 0.3 gm/cm$^3$.

11. An article as in claim 1, further comprising a rebound value of at least 50%.

12. An article as in claim 1, further comprising a crosslinked microcellular polymeric thermoplastic elastomeric structure.

13. An article as in claim 1, the microcellular thermoplastic elastomeric polymeric structure constructed and arranged in a position to be compressed at least 50% and having a compression set of less than about 30%.

14. An article as in claim 8, wherein the microcellular thermoplastic elastomeric polymeric structure is metallocene-catalyzed polyethylene.

15. An article as in claim 12, wherein the crosslinked thermoplastic elastomeric polymeric structure is a thermoplastic elastomeric olefin.

16. An article as in claim 12, formed by activation of a crosslinking agent in a precursor of the structure.

17. An article as in claim 13, wherein the crosslinked microcellular thermoplastic elastomeric polymeric structure is metallocene-catalyzed polyethylene.

18. An article as in claim 13, the microcellular polymeric structure constructed and arranged in a position to be repeatedly compressed, at least 500 times, at least 50% and having a compression set of less than about 30%.

19. An article as in claim 13, the microcellular polymeric structure constructed and arranged in a position to be compressed at least 50%, and having a compression set of less than about 30% and a rebound of at least about 50%.

20. An article as in claim 13, the microcellular polymeric structure constructed and arranged in a position to be compressed at least 50%, at least 500 times, and having a compression set of less than about 30% and a rebound of at least about 50%.

21. An article as in claim 16, formed by irradiative crosslinking of a precursor of the structure.

22. An article as in claim 17, further comprising a compression set of less than about 2%.

23. An article comprising a microcellular thermoplastic elastomeric polymeric structure including a compression set of less than about 30%, a density of less than 0.5 gm/cm$^3$, a rebound value of at least 50%, an average cell size of less than 100 $\mu$m, and a maximum cell size of less than 125 $\mu$m, the thermoplastic elastomeric polymeric structure comprising a thermoplastic phase, having a first softening temperature, intermingled with an elastomeric phase, having a second softening temperature different than the first softening temperature.

24. An article as in claim 23, further comprising an average cell size of less than 75 $\mu$m.

25. An article as in claim 24, further comprising an average cell size of less than 50 $\mu$m.

26. An article as in claim 24, further comprising an average cell size of less than 30 $\mu$m.

27. An article comprising a crosslinked microcellular thermoplastic elastomeric polymeric structure including a compression set of less than about 2%, a density of less than 0.5 gm/cm$^3$, a rebound value of at least 50%, an average cell size of less than 100 $\mu$m, and a maximum cell size of less than 125 $\mu$m, the thermoplastic elastomeric polymeric structure comprising a thermoplastic phase, having a first softening temperature, intermingled with an elastomeric phase, having a second softening temperature different than the first softening temperature.

28. An article as in claim 27, further comprising an average cell size of less than 75 $\mu$m.

29. An article as in claim 28, further comprising an average cell size of less than 50 $\mu$m.

30. An article as in claim 28, further comprising an average cell size of less than 30 $\mu$m.

31. An article comprising a shoe sole constructed for attachment to a shoe upper, formed of thermoplastic elastomeric polymeric microcellular material comprising a thermoplastic phase, having a first softening temperature, intermingled with an elastomeric phase, having a second softening temperature different than the first softening temperature.

32. An article comprising a gasket formed of thermoplastic elastomeric polymeric microcellular material comprising a thermoplastic phase, having a first softening temperature, intermingled with an elastomeric phase, having a second softening temperature different than the first softening temperature.

33. A method comprising:
   providing a precursor of a crosslinked microcellular thermoplastic elastomeric polymeric structure comprising a thermoplastic phase, having a first softening temperature, intermingled with an elastomeric phase, having a second softening temperature different than the first softening temperature; and
   crosslinking the precursor to form a crosslinked microcellular thermoplastic elastomeric polymeric structure.

34. A method as in claim 33, comprising crosslinking the precursor by activating a crosslinking agent.

35. A method as in claim 34, comprising crosslinking the precursor by irradiating the precursor.

36. An article as in claim 1, wherein the microcellular thermoplastic elastomeric polymeric structure is un-crosslinked.

* * * * *